Dec. 22, 1953 G. W. MAGILL 2,663,371
CONTROL SYSTEM FOR TANDEM ROTOR HELICOPTERS
Filed Dec. 17, 1945 3 Sheets-Sheet 3
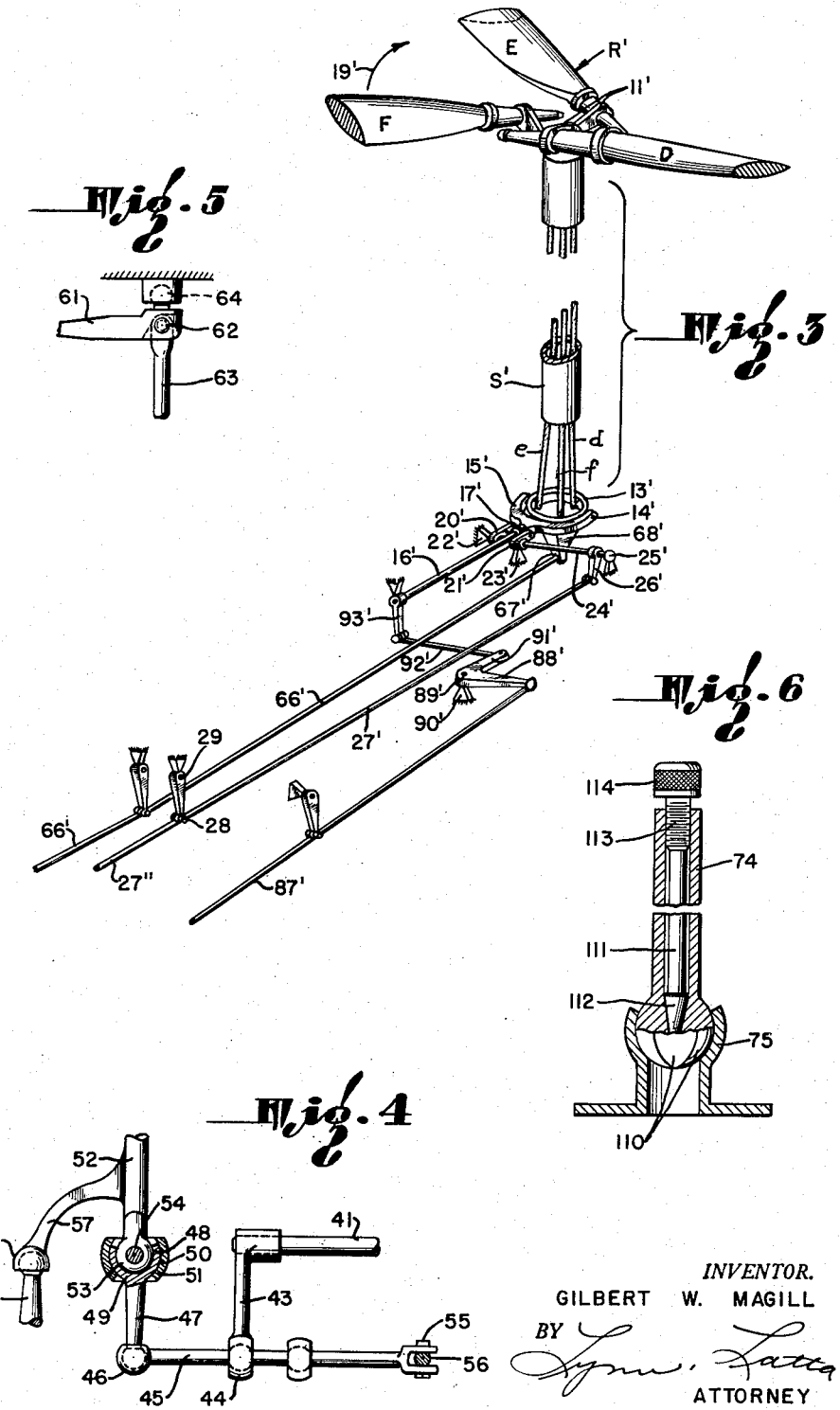
INVENTOR.
GILBERT W. MAGILL Patented Dec. 22, 1953

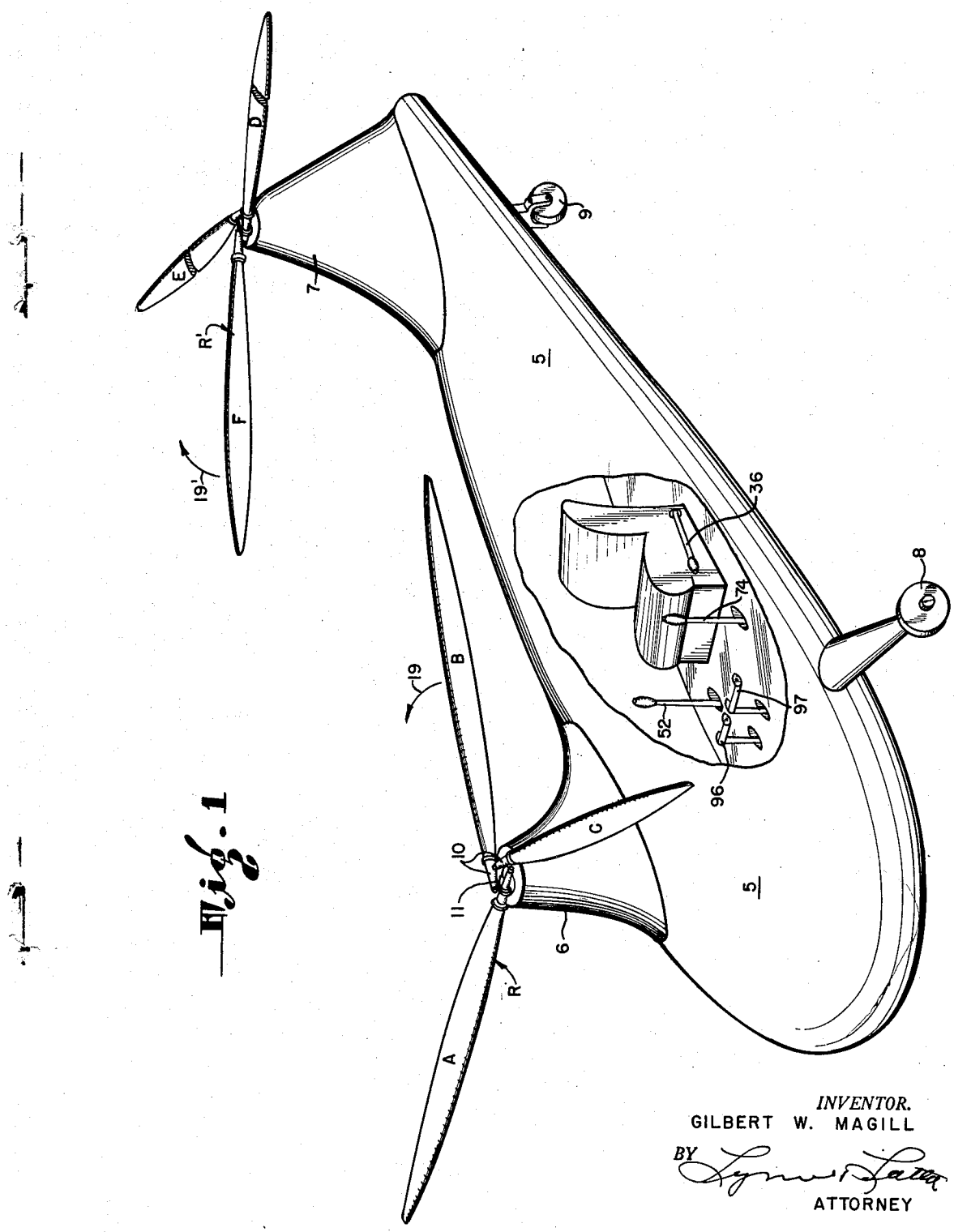

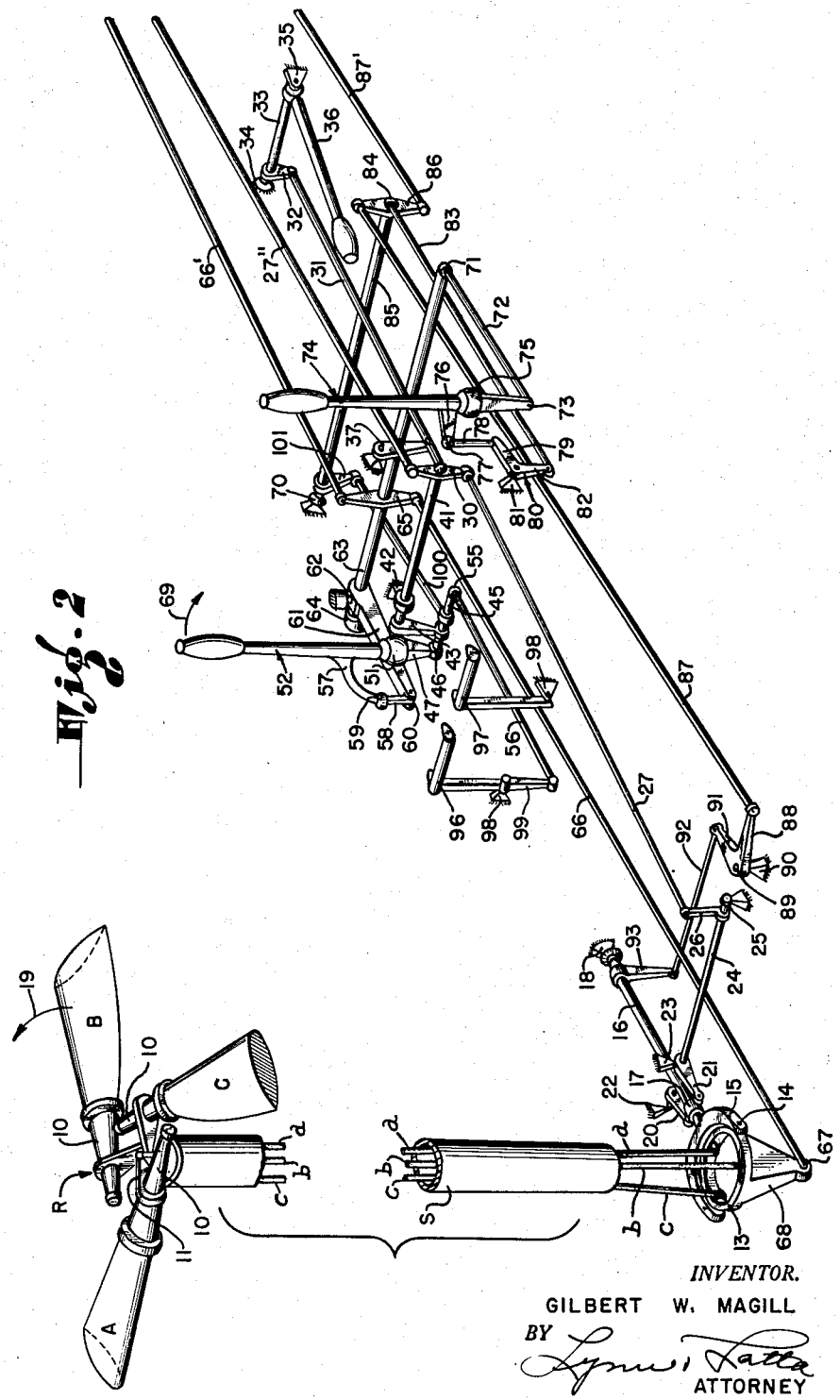

2,663,371

UNITED STATES PATENT OFFICE 2,663,371

CONTROL SYSTEM FOR TANDEM ROTOR HELICOPTERS

Gilbert W. Magill, Los Angeles, Calif.

Application December 17, 1945, Serial No. 635,443

6 Claims. (Cl. 170—135.24)

This invention relates to helicopters and has as its general object to provide a control system for a separate axis, dual rotor, helicopter. By "separate axis" I have reference to an arrangement of two rotors so that their axes are separated rather than coaxial, and with the circular areas traversed by their blades either separated from each other or only partially overlapping or intermeshing.

The conventional method of achieving horizontal translational flight with a helicopter is to incline the rotor axis from the vertical. This may be done by either tilting the entire helicopter or by tilting only the rotor or rotors. One of the objects of my invention is to provide a helicopter which will achieve horizontal translational flight without inclination of the rotors.

The fundamental characteristic of the invention is the provision for "paddle" control, which involves the cyclic pitch change of the blades of both rotors in such a manner as to balance out the pitching and banking moments and produce a paddling of the blades in the desired direction. It is an object of the invention to provide a control system which will produce paddling movement in any horizontal direction. Another object is to provide a control system adapted to combine a paddling action with a change in attitude. For example, a normal method of forward flight would be a combination of forward paddling and a slight nosing down of the longitudinal axis of the ship. However, the invention contemplates the provision of separate attitude and paddle control so that whenever desired the paddling action can be produced without varying the attitude of the craft from a horizontal position.

One of the important objects of the invention is to avoid the necessity for the use of a flapping type of rotor blade. The invention makes it possible to associate the blade axis rigidly with the rotor axis, utilizing purely a change in pitch angle in order to effect all of the various control functions.

Another object of the invention is to provide a helicopter in which control is achieved entirely through the interaction of collective and cyclic blade pitch change. Collective pitch change is utilized for controlling the total lift of the rotors and also for nosing down and nosing up attitude changes. Cyclic pitch change is utilized for banking, steering and paddling control. "Paddling" may be defined as the reaction through which the rotor moves translationally in a direction opposite the direction in which a blade moves when it achieves the maximum cyclic blade angle.

Another object of the invention is to provide a control system having suitable compensating mechanism for balancing out undesired components of the forces which the invention aims to produce.

Further objects and advantages of the invention will be brought out in the following detailed specification, taken in connection with the accompanying drawings, in which Fig. 1 is a perspective view of a helicopter embodying the invention;

Fig. 2 is a perspective view of a portion of the control mechanism of my invention;

Fig. 3 is a perspective view of the balance of the control mechanism;

Fig. 4 is a detail of the interlinking compensating mechanism;

Fig. 5 is a detail of another part of the control mechanism; and

Fig. 6 is a detail sectional view of a control lever.

As an example of one form in which the invention may be embodied, I have shown in the drawings a helicopter embodying a fuselage 5, a forward pylon 6, and a rear fin 7 functioning as a stabilizer with landing gears 8 and 9 for supporting the craft on the ground, and a pair of rotors R and R' disposed at the upper ends of the pylon 6 and fin 7. The rotors R and R' may be constructed in accordance with the disclosure in the pending application of Pieter J. Brouwer, Serial No. 572,505, filed January 12, 1945, for Helicopter, now Patent No. 2,509,128. Each rotor embodies three blades, designated A, B, and C in the rotor R and designated D, E, and F in the rotor R'. The blades A–F are mounted in a hub (not shown) at the upper end of hollow rotor shafts S, S' on axes rigidly associated with the respective shafts S, S'. Each blade is rotatable about its axis (the axis of the shank portion 10 of the blade, extending generally longitudinally of the blade, although not necessarily intersecting the blade throughout its length).

The fundamental design and general characteristics are as shown in my pending application, Serial No. 505,564, filed October 8, 1943 for Aircraft, now abandoned. The rotors R and R' are arranged in tandem, i. e., forward and aft of the fuselage 5. An interconnecting drive operates through both rotor shafts S and S' to simultaneously drive both rotors in rotatively opposite directions. Since the drive mechanism forms no part of the present invention and to attempt to show it would be confusing, it is not herein illustrated.

Each rotor blade has affixed to the shank 10 thereof, a crank arm 11, to the end of which is pivoted a control rod. These rods are designated $a$, $b$, $c$, $d$, $e$, $f$, to correspond to the designations of the blades to which they are respectively connected. The three control rods for each rotor extend downwardly through the hollow shaft S and are pivoted at their lower ends to the inner races of swash rings 13, 13' at points spaced 120° apart. The swash rings 13, 13' include the aforesaid inner races and non-rotatable outer races in which the inner races are rotatably mounted.

The swash rings 13 and 13' have diametrically opposed trunnions 14, 14' by means of which the rings are pivoted in yokes 15, 15' upon axes extending at right angles to the longitudinal axis of the helicopter. The yokes 15, 15' in turn are carried by shafts 16, 16' which are journaled in bearings 17 and 18 on a common axis approximately parallel to the longitudinal axis of the helicopter. At this point it may be noted that the yokes 15, 15' may be oscillated in order to tilt the swash rings 13 laterally and that the rings 13 may be in turn tilted forwardly or aft about the axes of the trunnions 14, 14'. Tilting the ring 13 downwardly to the rear will cause each rotor blade to attain maximum pitch when extending toward the right (as viewed from the rear). This will become apparent by noting that such rearward and downward tilting causes a rod in the position of the rod $a$ to move downwardly oscillating a blade in the position of the blade A clockwise (as viewed from the hub end in Fig. 2). When the blades of the forward rotor thus attain their maximum pitch in the rightwardly extending position, they will tend to paddle the craft rearwardly as will be more fully explained hereinafter. Similarly, tilting the control ring 13' downwardly to the rear will cause its blades to assume maximum pitch when extending to the left, as viewed from the rear, and there will be a tendency to paddle the craft rearwardly. In the same manner, tilting the swash rings downwardly to the right (or left) will produce a tendency to paddle the craft to the right (or left). It should therefore be remembered that the direction in which the blades of a rotor tend to paddle the craft is always the direction of downward tilt of the swash ring of that rotor. This will facilitate following through the various control operations as they are described hereinafter.

The rotors R and R' are arranged to rotate in opposite directions. For example, the rotor R may rotate in a counterclockwise direction as indicated by the arrow 19 and the rotor R' may rotate in a clockwise direction as indicated by the arrow 19'. Consequently, by coordinated cyclic pitch change, in which the blades of one rotor will attain maximum pitch angle when travelling rearwardly in positions projecting transversely on one side of the machine and the blades of the other rotor will achieve maximum pitch angle when travelling rearwardly in positions projecting transversely on the other side of the machine, the tendency of one rotor to bank the craft toward the left will be neutralized by the tendency of the other rotor to bank the craft toward the right, and the combined paddling effect of the blades at their maximum blade angle position, each pushing rearwardly against the body of air in which it is moving, will produce a reactive forward thrust against the fuselage. Similarly, by producing cyclic pitch change in which the blades of each rotor achieve maximum angle when projecting directly toward the axis of the other rotor, the tendency of one rotor to nose the craft upwardly will be balanced out by the tendency of the other rotor to nose the craft downwardly, and there will be a net paddling effect in which both rotors will thrust against the air toward the right (looking forwardly) and there will be a reactive force against the fuselage 5 which will move it toward the left.

Again, by producing cyclic pitch change wherein the blades of the respective rotors will attain maximum pitch when extending directly away from each other in a line parallel to the longitudinal axis of the helicopter, there will be a net paddling effect which will move the craft bodily toward the right (looking forwardly).

I will now describe in detail the construction and operation of the various chains of control mechanism by which the desired control effects are produced:

Collective pitch control

Bearings 17 and 17' are pivotally mounted in the ends of crank arms 20, 21, 20' and 21' respectively. Each pair of crank arms is mounted in bearings 22, 23, 22' and 23' for vertical swinging movement such as to bodily raise and lower the yokes 15 and 15'. The bearings 18, 18' are such as to permit limited vertical swinging movement of the shafts 16, 16' in response to the movement of the crank arms 20, 20', 21, 21'. To the crank arms 21 and 21' are secured shafts 24, 24' which are journaled in the bearings 23, 23' and in bearings 25, 25'. Secured to the shafts 24, 24' are levers 26, 26', extending upwardly and downwardly respectively.

A pair of control rods 27, 27' are each linked to the levers 26, 26'. The control rod 27' is linked to an intermediate control rod 27'' through a coupling 28 which is supported on the lower end of a swinging bracket 29. The control rods 27 and 27'' are universally pivoted to the lower and upper arms respectively of a double crank 30. The crank 30 is universally pivoted to one end of a control rod 31, the other end of which is pivoted to the lower end of a crank arm 32 secured upon a shaft 33 journaled in bearings 34 and 35, on a transverse axis. Secured on the shaft 33 is a pitch control lever 36.

The crank 30 normally extends vertically. It is supported by the end of a rock shaft 41 to which it is fixed, the shaft end in turn being supported by a swinging bracket 37.

Collective pitch control operation results from movement of the lever 36, which oscillates the shaft 33 to swing the arm 32, thus shifting the rod 31 longitudinally and bodily shifting the crank 30 in a direction parallel to the longitudinal axis of the craft. Such bodily movement of the crank 30 will cause the control rods 27 and 27'' to move in the same direction, swinging the arms 26, 26' in opposite rotational directions and causing the yokes 15 and 15' to both move vertically in the same direction. Such vertical movement will cause the swash rings 13, 13' to be moved bodily vertically, without tilting, and will thereby cause the respective blades to be rotated in their sockets collectively to the same degree and their pitch to be thereby uniformly changed. Upward movement of the lever 36 will cause the swash rings 13, 13' to be moved downwardly, increasing the pitch of all the blades. Downward movement of the lever 36 will produce the opposite effect, decreasing the blade pitch.

Such collective blade pitch change in both rotors, to the same degree in the same direction, is utilized for changing the lift of the rotors.

Attitude control

The crank 30 is secured upon one end of the shaft 41, the other end of which is journaled in a universally mounted bearing 42. Secured to the shaft 41 opposite the crank 30 is a depending crank arm 43, the lower end of which has a universally pivotal connection 44 with an equalizer bar 45 (see Fig. 4). One end of the equalizer bar 45 has a universal pivotal connection 46 with the lower end of a depending crank arm 47. The upper end of the crank arm 47 is provided with a yoke 48 having a parallel sided cylindrical recess 49 therein and having a spherical exterior surface 50, which is universally pivoted in a bearing socket 51.

Diving and climbing are effected through differential collective pitch change, controlled by forward and aft movement, respectively, of an attitude control lever 52 which has a flat circular fulcrum region 53 pivoted at 54 on an axis parallel to the longitudinal axis of the helicopter in the recess 49. Consequently, while the lever 52 may be freely moved transversely without affecting the position of the crank arm 47, forward and aft movement of the lever 52 will be transmitted to the crank arm 47. From the arm 47 this movement will be transmitted to the equalizer bar 45, which will pivot upon a vertical pivot 55 connecting its left end (looking forwardly) to a control rod 56. Forward and aft swinging movement of the equalizer bar 45 will be transmitted to the crank arm 43, causing the oscillation of the shaft 41. Such oscillation, transmitted to the rocker arm 30, will cause the control rods 27 and 27' to move longitudinally toward or away from each other, rocking arms 26, 26' in the same direction of rotational movement. Counterclockwise movement (viewed from the left) of the crank arms 26, 26', transmitted in this manner, will cause the swash ring 13 to be moved bodily downwardly while the swash ring 13' is moved bodily upwardly. Consequently, the pitch of the blades of the rotor R will be collectively decreased while the pitch of the blades of the rotor R' will be collectively increased. As the result of this differential collective pitch change, the lift of the forward end of the helicopter will be decreased, while the lift at the rear end of the craft will be increased, and the overall result will be a nosing down of the helicopter. Conversely, clockwise movement of both crank arms 26 and 26' will result in nosing up.

Coincidental with the action above described will be a compensating action which will be described hereinafter under the heading "Compensating Mechanism."

Banking is effected through laterally unbalanced cyclic pitch change in which the blades of both rotors attain maximum pitch while extending transversely in the same direction (to one side or the other of the helicopter). Such laterally unbalanced pitch change is brought about by moving the attitude control lever 52 transversely. Such movement is transmitted through a crank arm 57, projecting laterally from the lower end of the lever 52. A link 58 having a universally pivotal connection 59 with the crank arm 57 extends downwardly therefrom and has at its lower end a universally pivotal connection 60 with one end of an arm 61. The other end of the arm 61 has a yoke in which is hinged on a vertical pivot 62 one end of a rock shaft 63 (see Fig. 5). This end of the arm 61 is universally pivoted in a bearing 64, forming a support for the connected ends of the arm 61 and rock shaft 63. Thus, the arm 61 may swing vertically to oscillate the shaft 63 in response to transverse movement of the attitude control lever 52. The pivot 62 permits the rock shaft 63 to swing bodily in a horizontal plane, as will be explained more fully hereinafter under the heading "Paddle Control Mechanism." Secured to an intermediate region of the rock shaft 63 is a double crank 65, to the upper and lower arms of which are pivoted respectively a pair of control rods 66 and 66'. The control rods 66 and 66' extend forwardly and aft respectively and are pivoted universally at 67 and 67', to the lower ends of levers 68 and 68' projecting downwardly from the swash rings 13, 13'.

Movement of the lever 52 toward the pilot's left, as indicated by the arrow 69, will rotate the rock shaft 63 clockwise as viewed in Fig. 2, will move the control rods 66 and 66' away from each other, will tilt the swash ring 13 downwardly at its rear side and the swash ring 13' upwardly at its rear side, and will thereby cause the blades of both rotors to attain maximum pitch when extending transversely to the right (the position of the blade A of the forward rotor and a position diametrically opposite the position of the blade D of the rotor R'). This will be clearly seen by following the movement of the control rods a, d. The control rod a, which has just reached the position of maximum downward movement, will have correspondingly moved blade A to the position of maximum pitch. The control rod d, which has just reached the position of maximum elevation, will have moved the blade D to the position of minimum pitch, and the position of maximum pitch will be diametrically opposite.

As the result of producing increased lift in both rotors on the right hand side of the machine and decreased lift on the left hand side, the helicopter will bank to the left. Movement of attitude control lever 52 toward the pilot's right will operate the control mechanism in the opposite direction and thereby cause the helicopter to bank to the right. It will be now apparent that the control mechanism is arranged to produce banking in the direction in which the control lever is moved.

Horizontal movement of the helicopter in any desired direction may be achieved under the control of:

Paddle control mechanism

The end of the rock shaft 63 opposite the arm 61 has a ball and socket connection 71 with a short control rod 72. The control rod 72 is universally pivoted at 73 to the lower end of a paddle control lever 74. The lever 74 is universally fulcrumed in a bearing 75. Rigidly secured to the lever 74 and extending transversely and toward the pilot's right is a crank arm 76, the outer end of which is universally pivoted at 77 to a vertical link 78. The link 78 at its lower end is pivoted to a horizontal arm 79 of a bell crank lever 80 which is fulcrumed on a horizontal transverse pivot on a bracket 81. The lever 80 has a downwardly projecting arm 82, to the lower end of which is pivoted a control rod 83. The control rod 83 extends aft and is universally pivoted at 84 to the end of a rock shaft 85. Secured to this end of the shaft 85 is a double crank 86 having the upper and lower arms which are respectively pivoted to forwardly and rearwardly extending control rods 87, 87'. The end of the shaft 85 opposite the crank 86 is supported for universal pivotal movement in a bearing 70. The remote ends of the rods 87 and 87' are pivoted respectively to transverse arms 88, 88' of bell crank levers 89, 89'. The levers 89, 89' are fulcrumed on vertical pivots upon brackets 90, 90'. The arms 88, 88' extend to the left with reference to the forwardly facing pilot. The bell crank levers 89, 89' have rearwardly extending arms 91, 91', normally parallel to the longitudinal axis of the helicopter. To the ends of these arms are pivoted transverse links 92, 92' which extend to the right and are pivoted at their opposite ends to downwardly extending arms 93, 93', secured to the shafts 16, 16'.

In the paddle control operation, the control lever 74 may be moved in any direction from its neutral position in which it extends upwardly on a vertical axis as shown, and the helicopter will respond in the same direction. For example, by moving the lever 74 forwardly, the link 72 will be moved rearwardly, swinging the shaft 63 in a horizontal plane rearwardly about the pivot 62 and shifting the crank 65 bodily aft. This movement, transmitted through the control rods 66, 66' will tilt both of the swash rings 13, 13' downwardly and forwardly. Consequently the blades of each rotor will attain minimum pitch angle when moving forwardly at the positions of the blades A and D, and will thus have reduced drag at those positions, while in the diametrically opposite positions, the blades of each rotor will attain maximum pitch and therefore maximum paddling effect while moving directly rearwardly. The reactive force against the pylons 6 and 7 will move the helicopter in forward direction. Since maximum lift in one rotor occurs on one side of the craft and maximum lift in the other rotor occurs on the other side of the craft, the rolling moments produced by such maximum lift will be substantially balanced out so that the helicopter may maintain an even keel.

Movement of the paddle control lever 74 rearwardly will operate the control mechanism in the opposite direction and cause the craft to move rearwardly.

Movement of the paddle control lever 74 to the pilot's right will swing the crank arm 76 downwardly, move the control rod 83 forwardly, and thereby shift the rocker arm 86 bodily forwardly without oscillation thereof. Such movement, transmitted through the control rods 87, 87', will shift the links 92, 92' to the left as viewed from the rear, tilting the swash rings 13, 13' clockwise as viewed from the rear. Consequently, the blades of the respective rotors will maintain maximum lift and drag when extending directly away from each other fore and aft, and will attain minimum drag and lift when extending fore and aft directly toward each other. As a result, the helicopter will be paddled toward the right, and the maximum lift, occurring when the blades are directly above the central longitudinal axis of the craft, will produce neither rolling moment nor pitching moment, the pitching moments being cancelled out.

In Fig. 6 I have shown a means for locking the control lever 74 in any desired position. Such means comprises a ball 110 on the lower end of the lever 74, split into a plurality of segments, and a shaft 111, extending downwardly through the tubular stem of the lever 74. At the lower end of the shaft 111 is a conical wedge 112 which coacts with a conical cavity in the ball 110, acting to spread the segments of the ball into gripping engagement with the spherical inner surface of the bearing 75 when wedged downwardly. This is accomplished by rotating the shaft 111, the upper end of which is threaded at 113 into the lever 74. A knob 114 is used for rotating the shaft 111.

Directional control of the helicopter is controlled through

Steering mechanism

The steering control mechanism includes a pair of interconnected foot pedals 96 and 97. Since I contemplate employing a conventional type of interconnecting mechanism and since it would be confusing to attempt to show it, I have omitted a disclosure of the interconnecting mechanism. These pedals are pivoted on bearings 98 and the pedal 96 has an arm 99 which extends below its pivot and is pivoted at its lower end to the control rod 56. A link 100 is pivoted at its forward end to the equalizer bar 45 and at its rear end is universally pivoted to the lower end of a downwardly extending crank arm 101 secured to the rock shaft 85 near the bearing 70. Pedal movement is transmitted through the control rod 56, the equalizer bar 45 (swinging horizontally about the pivot 46), the control rod 100 and arm 101 to oscillate the rock shaft 85 and crank 86, thereby moving the control rods 87, 87' in opposite directions and tilting the yokes 15, 15' in opposite directions. When the right pedal 96 is depressed forwardly, the front swash ring will be tilted downwardly on its right side and the rear swash ring 13' will be tilted downwardly on its left side. Consequently, the front rotor will paddle toward the right and the rear rotor will paddle toward the left, thus causing the helicopter to make a right turn. Such a turn may, if desired, be negotiated without banking, although if desired the attitude control mechanism may be simultaneously operated so as to add banking moment.

Depression of the pedal 97 will act through the interconnecting mechanism to move the pedal 96 rearwardly, operating the steering control mechanism in the opposite direction from that described above and producing a left turn.

It will be now observed that the invention provides for turning the helicopter to the right when the right pedal is depressed and turning the helicopter to the left when the left pedal is depressed.

A characteristic of the cyclic pitch change utilized in turning is a tendency of the helicopter to nose upwardly as the result of the fact that the blades of both rotors attain maximum pitch when projecting forwardly (or rearwardly, depending upon the direction of the turn being made). While the pitching moment thus produced is considerably smaller than the differential collective pitch brought about through the attitude control mechanism for nosing the ship upwardly or downwardly, it is nevertheless a force which must be reckoned with, and since it is an undesirable one, the invention proposes to counteract it through the

Compensating mechanism

The parts of the interconnecting mechanism have already been described. This mechanism includes an equalizer bar 45 and the crank arms 43 and 47, together with the connections to the other parts including the control rods 56 and 100.

Movement of the rod 56, transmitted through the equalizer bar 45 to the rod 100, also produces an increment of movement of the arm 43 which oscillates the rock shaft 41 and crank 30 to produce a differential collective pitch change in the two rotors which will counteract the undesirable pitching moment attending the turning operation. For example, when the pedal 96 is depressed to produce the right turn by effecting a high blade angle in blades that are projecting forwardly, the increased lift of the forward sides of the two rotors will tend to cause the helicopter to nose upwardly. This upward pitching moment is counteracted by a downward pitching moment which is produced by collectively changing the pitch of the rear rotor blades to an increased blade angle while collectively decreasing the angle of the forward rotor blades. This is brought about by the relatively small amount of rearward movement of the arm 43, transmitted from the control rod 56, oscillating the rock shaft 41 and crank 30 counter-clockwise as viewed in Fig. 2, oscillating the rock shafts 24, 24' clockwise bodily raising the swash ring 13 and bodily lowering the swash ring 13', so as to decrease blade pitch in the rotor R and increase blade pitch in the rotor R'.

The compensation mechanism corrects another unwanted force which appears as an incident to the operation of the attitude control mechanism to cause the helicopter to nose upwardly or downwardly. The collective increase in blade angle in one rotor, coupled with the collective decrease in blade angle in the other rotor, produces a slightly greater torque in the rotor having the greater blade angle, and a reduced torque in the other rotor. This torque differential reacts upon the helicopter so as to tend to turn it in the direction opposite the direction of rotation of the rotor having the higher torque.

Counteraction of this turning moment is effected by producing a moderate turning movement, through the steering mechanism, in the direction opposite and equal to the undesirable turning moment. For example, when the attitude control lever 52 is moved rearwardly in order to produce a nosing up of the helicopter, the forward swinging movement of the equalizer bar 45 around the pivot 55 which is transmitted to the arm 43 to produce the upwardly pitching moment, will also be transmitted, to a reduced degree, to the control rod 100, to produce a small amount of clockwise oscillation of the rock shaft 85 and rocker arm 86, thereby tilting the swash ring 13 downwardly on its left side and the swash ring 13' downwardly on its right side, as viewed from the rear. Consequently, the blades of the respective rotors will attain maximum pitch and paddling effect when extending directly toward each other, the forward end of the helicopter will be paddled toward the left and the rearward end will be paddled toward the right, thus producing a leftward turning moment which counteracts the rightward moment which is the reaction from the dominant leftward torque of the forward rotor.

General features of operation

It will be clear from the foregoing that any unit of the control system is capable of being operated independently (disregarding the compensating mechanism) to produce its own characteristic control action without assistance from the other controls. For example, it is possible by manipulating the paddle control mechanism, to cause the helicopter to translate movement in any direction while trimmed in an attitude in which its rotor axes are perfectly vertical. However, it is contemplated that ordinarily, the paddle control and attitude mechanism will be operated simultaneously so as to utilize not only the paddling action, but also the tilting of the rotor axes in the direction of travel in order to attain the most effective horizontal movement of the craft. For example, for forward travel both the paddle control lever 74 and the attitude control lever 52 may be moved forwardly, thus producing a combination of forward paddling action and forward tilting of the machine (and hence the rotor axes) so as to add to the paddling effect, the forward component of rotor lift. Similarly, to produce movement of the craft toward the right, both levers 52 and 74 may be moved toward the right, resulting in the combination of rightward paddling and rightward banking (adding a rightward component of rotor lift to the rightward paddling effect).

Other maneuvers which may become desirable in special circumstances can be executed by moving the control levers 52 and 74 oppositely and independently. For example, if the attitude control lever 52 is moved rearwardly and the paddle control lever 74 is simultaneously moved forwardly, the helicopter will be nosed upwardly while the paddle control moves it forwardly, whereby to produce a forward climb in which the fuselage will move more nearly parallel to the airstream than is possible with other helicopters (which must nose downwardly in making a forward climb) and thus be exposed transversely to the air currents.

Another control operation possible with my control system is the utilization of a moderate amount of lateral paddling action to counteract the effect of a side wind and permit the helicopter to pursue a direct course toward its objective with its longitudinal axis aligned with such course, despite the side wind.

I claim as my invention:

1. In a helicopter having contra-rotating motor-driven lift rotors disposed on horizontally separated rotor axes and each provided with adjustable pitch blades tiltably mounted for pitch adjustment about axes that are fixed with reference to the respective rotor axis, swash rings for transmitting blade pitch adjustment to the blades of the respective rotors, means in which said swash rings are mounted for bodily shifting vertical movement for collective pitch change, an attitude control lever, mounted for universally pivotal movement, a crank shaft connected to said attitude control lever for receiving rotative movement therefrom when said lever is moved fore or aft, a bearing in which the end of said crank shaft adjacent said lever is mounted for rotative movement and for planar swinging movement, crank means on said crank shaft disposed toward the swinging end of said crank shaft, linkage responsive to rotative movement of said crank means for transmitting to said swash ring supporting means, vertical movements in opposite directions for effecting differential collective pitch change in the respective rotors for diving and climbing operations, and control means for effecting said planar swinging movement of said crank shaft without substantial rotation thereof whereby to bodily move said crank means and transmit to said swash ring supporting means, vertical movements in the same direction to effect collective pitch change in said rotors for direct ascending and descending operations.

2. In a helicopter having contra-rotating motor-driven lift rotors disposed on horizontally separated rotor axes and each provided with blades tiltably mounted for pitch adjustment about axes that are fixed with reference to the respective rotor axis, swash rings for transmitting blade pitch adjustment to the blades of the respective rotors, a yoke in which each swash ring is mounted for tilting adjustment about a first axis transverse to the rotor axis, means supporting each yoke for tilting adjustment about a second axis transverse to the rotor axis and at right angles to said first transverse axis, control transmitting means including a crank, means supporting said crank for both rotational and bodily translational movement, a paddle control member mounted for universal pivotal movement, means responsive to swinging movement of said paddle control member in one plane for transmitting to said yokes, rotational movements in the same direction for effecting lateral paddling propulsion in both rotors in the same direction for bodily lateral translational movement of the helicopter, means responsive to swinging movements of said paddle control member in a plane transverse to the aforesaid plane, for effecting bodily translational movements of said crank for effecting tilting of said swash rings in the same direction about said first axes, for effecting cyclic pitch change in said rotors resulting in fore or aft paddling propulsion in both rotors for normal forward or backward flight, an attitude control lever, and means connecting said attitude control member to said crank for transmitting rotation thereto whereby to tilt said swash rings in opposite directions and to thereby effect cyclic pitch change in said rotors in which the lift in both rotors is increased at the same side of the helicopter, for banking operations.

3. In a helicopter having contra-rotating motor-driven lift rotors disposed on horizontally separated rotor axes and each provided with blades tiltably mounted for pitch adjustment about axes that are fixed with reference to the respective rotor axes, swash rings for transmitting blade pitch adjustment to the blades of the respective rotors, a yoke in which each swash ring is mounted for tilting adjustment about a first axis transverse to the rotor axis, means supporting each yoke for tilting adjustment about a second axis transverse to the rotor axis and at right angles to said first transverse axis, means supporting each of said yoke supporting means for bodily vertical adjustment of the respective yokes, an attitude control lever, a bearing in which said lever is mounted for universal swinging movement, an arm mounted for fore-aft swinging movement on a transverse axis intersecting the center of said bearing, means linking said arm to said lever to receive fore-aft swinging movement therefrom, said linking means including parts that are relatively movable laterally so as to accommodate lateral movement of said lever without transmitting such lateral movement to said arm, means for transmitting from said arm to said yoke supporting means bodily vertical shifting movements of said yokes in opposite directions for differential collective pitch change in the respective rotors for diving and climbing operations, and means for transmitting directly from said lever but not through said arm, lateral movements of said lever for tilting said swash rings about said first axes in opposite directions for cyclic pitch change in the respective rotors such as to increase the lift in both rotors at the same side of the helicopter, for banking operations.

4. In a helicopter, a pair of contra-rotating, power-driven lift rotors arranged in tandem and provided with variable pitch, fixed axis blades; swash rings for transmitting blade pitch adjustment to the blades of the respective rotors, a yoke in which each swash ring is mounted for tilting adjustment about a first axis transverse to the rotor axis, means supporting each yoke for tilting adjustment about a second axis transverse to the rotor axis and at right angles to said first transverse axis, means for bodily shifting said yoke supporting means vertically; a first crank, linkage connecting said crank to said yoke shifting means for shifting said yokes vertically in opposite directions in response to rotating movements of said crank for effecting attitude change through differential rotor lift, and for shifting said yokes vertically in the same direction in response to bodily movement of said crank, producing overall lift change for direct ascending and descending operations; a second crank, means mounting said second crank for rotating and bodily shifting movements, means connecting said second crank to said swash rings for tilting them in opposite directions about said first transverse axes in response to rotative movement of said second crank for cyclically changing blade pitch in both rotors in the same direction on the same side of the helicopter for banking operations, and to tilt said swash rings about said first axes in the same direction in response to bodily movement of said second crank, for effecting cyclic blade pitch change such as to produce fore or aft horizontal propulsion by paddling operation of said rotors; a third crank, means connecting said third crank to said yokes for rotating the yokes in opposite directions in response to rotative movement of said third crank for effecting cyclic pitch change such as to effect lateral paddling operation of said rotors in opposite lateral directions for steering operations, and to tilt said yokes in the same direction in response to bodily movement of said third crank whereby to effect cyclic pitch change such as to effect lateral paddling operation in both rotors in the same direction for lateral propulsion of the helicopter; an attitude control lever connected to said first crank for transmitting rotative movements thereto in response to fore and aft movements thereof and to said second crank for transmitting rotative movements thereto in response to lateral movements thereof; a paddle control lever connected to said second crank for transmitting bodily shifting movements thereto in response to fore and aft movements of said paddle control lever and to said third crank for transmitting bodily shifting movements thereto in response to lateral movements of said paddle control lever; steering control means for transmitting rotative movement to said third crank, and lift control means for transmitting bodily shifting movements to said first crank.

5. In a helicopter having contra-rotating motor driven lift rotors disposed on horizontally separated rotor axes and each provided with adjustable pitch fixed axis blades, swash devices for transmitting blade pitch adjustment to the blades of the respective rotors; means mounting each of said swash devices for tilting movements about first and second tilt axes disposed transversely to the rotor axis and in crossed relation to each other, for effecting cyclic pitch change of the blades when said swash devices are tilted, with tilting movement about the first of said tilt axes resulting in maximum and minimum blade angles and therefore fore-aft propulsive paddling movement, in blades moving fore and aft, and tilting movements about said second tilt axis resulting in maximum and minimum blade angles, and therefore lateral paddling movement in blades moving laterally with respect to the flight path; means mounting each of said swash devices for bodily translational movement along the respective rotor axes, for transmitting collective pitch change movements to the respective blades; attitude control means for simultaneously transmitting to the respective swash devices, bodily translational movements in opposite directions for collectively increasing blade pitch of one rotor over that of the other rotor, for controlling the attitude of the helicopter; steering control mechanism for simultaneously tilting the respective swash devices about their respective second tilt axes for lateral paddling cyclic blade pitch change in the respective rotors, with such change in one rotor effecting paddling in one lateral direction and the change in the other rotor effecting paddling in the other lateral direction, for steering control; and interlinking compensating means connecting said steering control means to said attitude control means so as to automatically transmit from said attitude control means to said steering control means, steering control movements operative to produce in the helicopter a turning moment contra to and balancing out the turning moment in the helicopter caused by the differential between the torque reactions from the respective rotors, resulting from the collective blade angle increase in one rotor over that in the other.

6. In a helicopter having contra rotating motor driven lift rotors arranged in tandem and provided with adjustable pitch fixed axis blades, swash devices for transmitting blade pitch adjustment to the blades of the respective rotors; means mounting each of said swash devices for tilting movements about first and second tilt axes disposed transversely to the rotor axis and in crossed relation to each other, for effecting cyclic pitch change of the blades when said swash devices are tilted, with tilting movement about the first of said tilt axes resulting in maximum and minimum blade angles and therefore fore-aft propulsive paddling movement, in blades moving fore and aft, and tilting movements about said second tilt axis resulting in maximum and minimum blade angles, and therefore lateral paddling movement in blades moving laterally with respect to the flight path; means mounting each of said swash devices for bodily translational movement along the respective rotor axes, for transmitting collective pitch change movements to the respective blades; a paddle control member; means for transmitting from said paddle control member to said swash devices, tilting movements about said first axes, whereby to cause forward propulsive paddling at one side of one rotor and at the other side of the other rotor; an attitude control member; and means interlinking said attitude control member to said swash devices for tilting the latter about said second axes, whereby to cause the blades of both rotors to attain maximum blade angle on the same side of the longitudinal axis of the helicopter, whereby to effect a change in attitude.

GILBERT W. MAGILL.

References Cited in the file of this patent

UNITED STATES PATENTS

| Number | Name | Date |
|---|---|---|
| 1,350,982 | Beurrier et al. | Aug. 24, 1920 |
| 1,783,011 | Florine | Nov. 25, 1930 |
| 1,900,689 | Baum | Mar. 7, 1933 |
| 1,915,855 | Hess | June 27, 1933 |
| 1,919,089 | Breguet et al. | July 18, 1933 |
| 2,256,918 | Young | Sept. 23, 1941 |
| 2,290,224 | Bowers | July 21, 1942 |
| 2,330,842 | Pullin | Oct. 5, 1943 |
| 2,384,445 | Apostolescu | Sept. 11, 1945 |
| 2,394,846 | Cox | Feb. 12, 1946 |
| 2,414,435 | Bendix | Jan. 21, 1947 |
| 2,445,354 | Hoppes | July 20, 1948 |

FOREIGN PATENTS

| Number | Country | Date |
|---|---|---|
| 48,770 | France | Mar. 18, 1938 |
| | (First Add. to Pat. #812,893) | |
| 155,974 | Switzerland | Oct. 1, 1932 |